US009632363B2

(12) United States Patent
Li et al.

(10) Patent No.: US 9,632,363 B2
(45) Date of Patent: Apr. 25, 2017

(54) METHOD FOR RUBBING ALIGNMENT LAYER AND LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongpeng Li, Beijing (CN); Sunghun Song, Beijing (CN); Jingpeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 22 days.

(21) Appl. No.: 14/528,246

(22) Filed: Oct. 30, 2014

(65) Prior Publication Data
US 2015/0370134 A1 Dec. 24, 2015

(30) Foreign Application Priority Data
Jun. 19, 2014 (CN) .......................... 2014 1 0277662

(51) Int. Cl.
G02F 1/1337 (2006.01)
G02F 1/1339 (2006.01)

(52) U.S. Cl.
CPC .... *G02F 1/133784* (2013.01); *G02F 1/13394* (2013.01)

(58) Field of Classification Search
CPC ......... G02F 1/133784; G02F 1/133723; G02F 1/1339
See application file for complete search history.

(56) References Cited

U.S. PATENT DOCUMENTS 9,147,802 B2 * 9/2015 Chien ................. G02F 1/13454
2002/0149727 A1 * 10/2002 Wang ..................... G02F 1/141
349/123

(Continued)

FOREIGN PATENT DOCUMENTS

CN 1380580 A 11/2002
CN 1485665 A 3/2004

(Continued)

OTHER PUBLICATIONS

First Office Action regarding Chinese application No. 201410277662.3, dated Mar. 29, 2016. Translation provided by Dragon Intellectual Property Law Firm.

*Primary Examiner* — Nathanael R Briggs
(74) *Attorney, Agent, or Firm* — Harness, Dickey & Pierce, P.L.C.

(57) ABSTRACT

The present disclosure provides a method for rubbing an alignment layer and a liquid crystal display panel. The method includes: performing a first rubbing on the alignment layer of a liquid crystal display panel in a first rubbing direction; and performing a second rubbing on the alignment layer of the liquid crystal display panel in a second rubbing direction. The second rubbing direction is an arrangement direction of liquid crystal molecules when the liquid crystal molecules are arranged correctly on the alignment layer. The second rubbing direction is different from the first rubbing direction.

7 Claims, 3 Drawing Sheets

(56) References Cited

U.S. PATENT DOCUMENTS

| | | | |
|---|---|---|---|
| 2009/0033821 A1* | 2/2009 | Lee | G02F 1/134309 349/48 |
| 2010/0295755 A1* | 11/2010 | Broughton | G02F 1/1323 345/32 |
| 2011/0007251 A1* | 1/2011 | Yamamoto | G02F 1/133514 349/108 |
| 2012/0099073 A1* | 4/2012 | Park | G02F 1/133784 349/187 |
| 2015/0146149 A1* | 5/2015 | Imanishi | G02F 1/1337 349/123 |

FOREIGN PATENT DOCUMENTS

| | | | | |
|---|---|---|---|---|
| CN | 201864862 U | 6/2011 | | |
| CN | 103748508 A | 4/2014 | | |
| KR | CN 1380580 A * | 11/2002 | | G02F 1/141 |

* cited by examiner

METHOD FOR RUBBING ALIGNMENT LAYER AND LIQUID CRYSTAL DISPLAY PANEL

CROSS-REFERENCE TO RELATED APPLICATION

This application claims a priority of the Chinese patent application No. 201410277662.3 filed on Jun. 19, 2014, which is incorporated herein by reference in its entirety.

FIELD OF THE INVENTION

The present disclosure relates to the field of liquid crystal display technology, in particular to a method for rubbing an alignment layer, and a liquid crystal display panel.

DESCRIPTION OF THE PRIOR ART

Liquid crystal display (LCD) is a flat, ultrathin display device and consists of a certain number of color or black/white pixels arranged in front of a light source or a reflective surface. A main principle of the LCD is to stimulate liquid crystal molecules with current so as to produce dots, lines and faces which cooperate with lamp tubes arranged at the back of the LCD to form an image. The LCD is very popular due to its features such as a thin body, low power consumption, and low radiation.

For a liquid crystal display screen, alignment layers are adhered onto upper and lower glass substrates, so as to enable the liquid crystal molecules to be arranged in a fixed direction, thereby optimizing a display effect and a viewing angle. However, after the alignment layer is heated and cured, uneven surface alignment will occur, and the liquid crystal molecules will be unorderly distributed on the alignment layer. Because an alignment effect plays a very important role in such basic properties of the LCD as evenness, viewing angle, chromatic aberration and response speed, it is required to perform alignment treatment on the alignment layer before filling the liquid crystals.

A rubbing alignment technology is the most widely-used one for manufacturing various LCDs. The so-called "rubbing alignment" refers to loading such materials as Nylon, fibers or lint onto a rubbing machine and rubbing the alignment layers on the upper and lower substrates in a direction required by the process, so as to change surface conditions of the alignment layers and anchor the liquid crystal molecules uniformly, thereby arranging the liquid crystal molecules uniformly at a certain pretilt angle within a display region between the upper and lower glass substrates of the LCD. As shown in FIG. 1, a single rubbing manner is usually adopted the prior art. Specifically, at first, a material of the alignment layer, usually polyimide (PI), is coated onto a substrate with spacers PS, so as to form a film of the alignment layer on the substrate. Then, a rubbing cloth (made of Nylon, fibers or lint) is used to rub the film in a column direction (vertical direction as shown in FIG. 1), so as to form an alignment layer with a side chain of PI molecules arranged in a certain direction, thereby ensuring the subsequently-injected liquid crystal molecules to be arranged orderly in the direction of the side chain of the PI molecules on the alignment layer. Due to presence of the spacers, a region S1 of the alignment layer is not rubbed, and this region forms a spacer shadow region.

For the LCD with a low resolution, the spacer usually is low and the resultant shadow region is small. According to an anchoring transfer principle, the liquid crystal molecules within the spacer shadow region are affected by the liquid crystal molecules within a non-shadow region, and may be normally aligned, and thus serious light leakage will not occur. Such a phenomenon where the adjacent liquid crystal molecule is normally aligned by means of the normally-aligned liquid crystal molecule through an intermolecular force is called as "anchoring transfer", and such capability of normally aligning the adjacent liquid crystal molecules is called as "anchoring capability".

For the LCD with a high PPI, the spacer is usually high and the resultant shadow region is large. The liquid crystal molecules at a center of the shadow region will be limitedly affected by the liquid crystal molecules within the non-shadow region, and thus the liquid crystal molecules at the center of the shadow region may not be normally aligned, and serious light leakage will occur. As a result, the image quality will be attenuated.

SUMMARY OF THE INVENTION

An object of the present disclosure is to provide a method for rubbing an alignment layer and a liquid crystal display panel, which can reduce light leakage of the liquid crystal display panel and improve image quality.

In order to achieve the above object, one embodiment of the present disclosure provides a method for rubbing an alignment layer, including: performing a first rubbing on the alignment layer of a liquid crystal display panel in a first rubbing direction; and performing a second rubbing on the alignment layer of the liquid crystal display panel in a second rubbing direction; wherein the second rubbing direction is an arrangement direction of liquid crystal molecules when the liquid crystal molecules are arranged correctly on the alignment layer; the second rubbing direction is different from the first rubbing direction.

Further, a rubbing strength of the second rubbing is higher than that of the first rubbing.

Further, an amount of indentation in the first rubbing is 0.2-0.4 mm; an amount of indentation in the second rubbing is 0.3-0.5 mm.

Further, an angle between the first rubbing direction and the second rubbing direction is greater than or equal to arctan (b/a), where a represents a row pitch between spacers of the liquid crystal display panel, and b represents a width of one spacer.

Further, the angle between the first rubbing direction and the second rubbing direction is equal to arctan (b/a).

Further, the first rubbing and the second rubbing are performed on the alignment layer with Nylon, fibers or lint.

Further, the alignment layer is made of polyimide.

One embodiment of the present disclosure provides a liquid crystal display panel including the alignment layer manufactured by the above-mentioned method.

Further, a spacer of the liquid crystal display panel has a height greater than or equal to 3.4 μm.

Further, the spacer of the liquid crystal display panel has a height less than 3.9 μm.

One embodiment of the present disclosure provides a method for rubbing an alignment layer, including: performing an N-th rubbing on the alignment layer of a liquid crystal display in a first rubbing direction; and performing an (N+1)-th rubbing on the alignment layer on which the N-th rubbing has been performed in a second rubbing direction; wherein N is an integer greater than 1; the second rubbing direction is an arrangement direction of liquid crystal molecules when the liquid crystal molecules are arranged correctly on the alignment layer; and the second rubbing direction is different from the first rubbing direction.

Further, an angle between the first rubbing direction and the second rubbing direction is greater than or equal to arctan (b/a), where a represents a row pitch between spacers of the liquid crystal display panel, and b represents a width of one spacer.

Further, the performing an N-th rubbing on the alignment layer of a liquid crystal display in a first rubbing direction includes: performing the N-th rubbing on a first surface of the alignment layer in the first rubbing direction; the performing an (N+1)-th rubbing on the alignment layer on which the N-th rubbing has been performed in a second rubbing direction includes: performing the (N+1)-th rubbing on the first surface on which the N-th rubbing has been performed in the second rubbing direction.

Further, an angle between the first rubbing direction and the second rubbing direction is 11°.

According to the method for rubbing the alignment layer in the present disclosure, the alignment layer of the liquid crystal display panel is rubbed twice, and the first rubbing direction is different from the second rubbing direction. The region (the shadow region) that is not rubbed in the two rubbing is smaller than the region that is not rubbed in a single rubbing. As a result, the region where the liquid crystal molecules cannot be aligned normally may be reduced, thereby reducing the light leakage.

DETAILED DESCRIPTION OF THE PREFERRED EMBODIMENTS

Implementation of the present disclosure will be described hereinafter in conjunction with the drawings and embodiments. The following embodiments are for illustrative purposes only, but shall not be used to limit the scope of the present disclosure.

Figure 1:
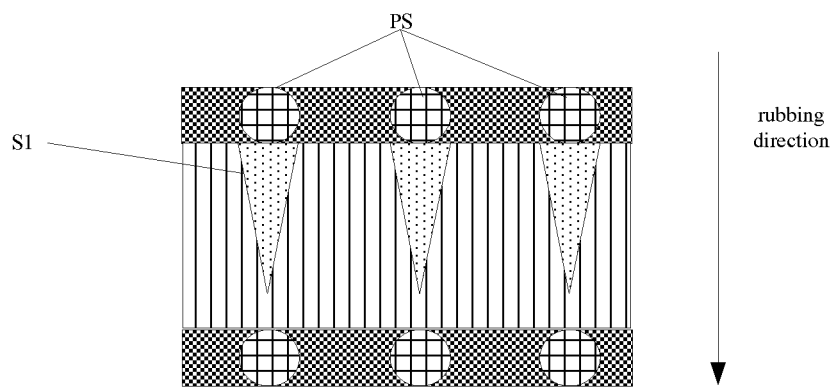
FIG. 1 is a schematic view showing an existing alignment rubbing process.
Figure 2:
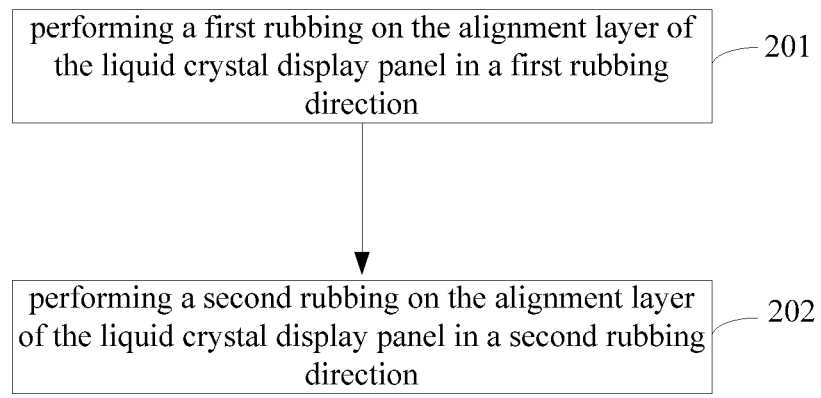
FIG. 2 is a flow chart of a method for rubbing an alignment layer according to one embodiment of the present disclosure.

As shown in FIG. 2, one embodiment of the present disclosure provides a method for rubbing an alignment layer of a liquid crystal display panel. The method includes:

Step 201: performing a first rubbing on the alignment layer of the liquid crystal display panel in a first rubbing direction; and Step S202: performing a second rubbing on the alignment layer of the liquid crystal display panel in a second rubbing direction.

The second rubbing direction is an arrangement direction of liquid crystal molecules when the liquid crystal molecules are arranged correctly on the alignment layer. The second rubbing direction is different from the first rubbing direction.

Figure 3:
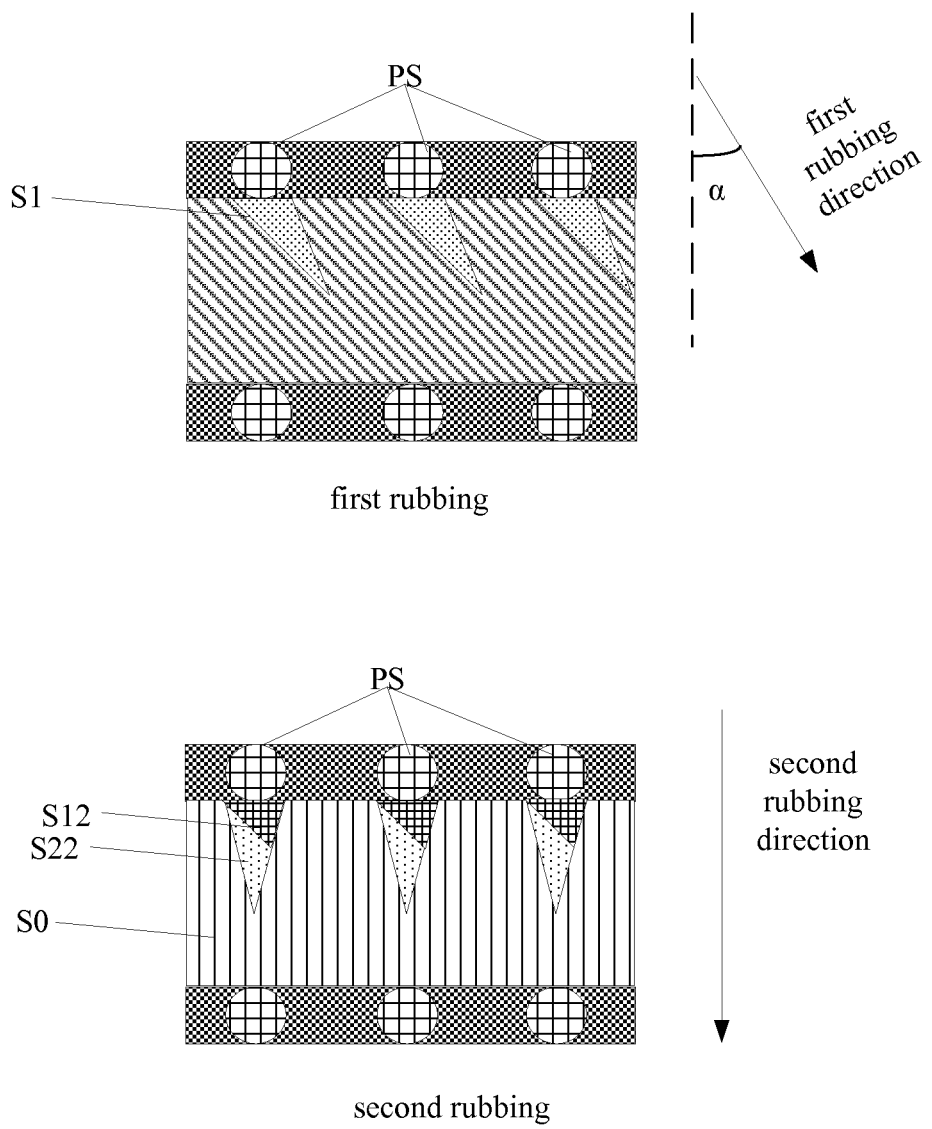
FIG. 3 is a process flow chart of a method for rubbing the alignment layer according to one embodiment of the present disclosure.

FIG. 3 is a process flow chart of a method for rubbing the alignment layer according to one embodiment of the present disclosure. As shown in FIG. 3, there is an angle α defined between the first rubbing direction of the first rubbing and a column direction (i.e., the arrangement direction of the liquid crystal molecules when the liquid crystal molecules are arranged correctly), and the second rubbing direction is the column direction. After performing the first rubbing, a shadow region corresponding to a spacer PS is S1. After performing the second rubbing, a shadow region corresponding to the spacer PS is S2 (which includes a region S12 and a region S22 shown in FIG. 3). A complementary set of S2, i.e., a region that is rubbed in the second rubbing, is S0. After the two rubbings, a resultant shadow region (the region that is totally not rubbed) is an intersection S12 between S1 and S2. It can be seen that, S12 has an area significantly less than S2.

Figure 4:
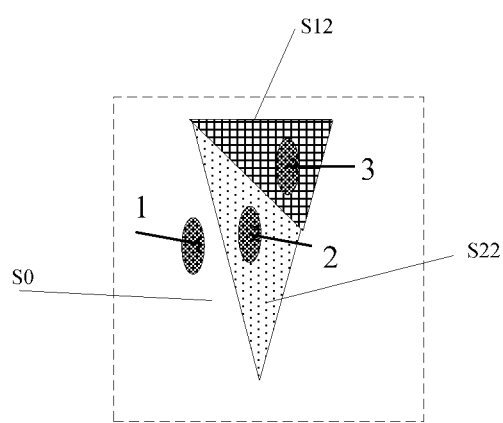
FIG. 4 is a schematic view showing alignments of liquid crystal molecules in the alignment layer manufactured by the method according to one embodiment of the present disclosure.

Referring to FIG. 4, after the liquid crystal molecules are injected subsequently, since a portion of the alignment layer in the region S0 is re-aligned in the second rubbing, thus, the liquid crystal molecules 1 in the region S0 are arranged in accordance with an alignment result obtained from Step S202 and thus may be aligned correctly. For the region S22, although an alignment direction in the region S22 is not the arrangement direction in which the liquid crystal molecules are required to be arranged, the liquid crystal molecules 2 in the region S22 may still be normally aligned under the effect of the liquid crystal molecules 1 in the region S0. The liquid crystal molecules 2 in the region S22 have strong anchoring capability to make the liquid crystal molecules 3 in the region S12 tend to be aligned correctly.

It should be appreciated that, in actual applications, the method of one embodiment of the present disclosure may include more than two rubbing processes, and a small shadow region will be obtained as long as a rubbing direction of a last rubbing process is the arrangement direction of the liquid crystal molecules when the liquid crystal molecules are arranged correctly and at least one rubbing direction of the rubbing processes is different from that of the last rubbing process. As a result, the liquid crystal molecules in corresponding regions may be better aligned, thereby reducing light leakage.

Further, a rubbing strength of the second rubbing is higher than that of the first rubbing.

The rubbing strength of the second rubbing being higher than that of the first rubbing may ensure the liquid crystal molecules to be arranged in the alignment direction caused by the second rubbing direction of the second rubbing. Of course, in actual applications, the rubbing strength of the second rubbing may also be equal to or less than that of the first rubbing.

Further, an amount of indentation in the first rubbing may be 0.2-0.4 mm; an amount of indentation in the second rubbing may be 0.3-0.5 mm.

Further, an angle between the first rubbing direction and the second rubbing direction is greater than or equal to arctan (b/a), where a represents a row pitch between spacers of the liquid crystal display panel, and b represents a width of one spacer. Setting the angle between the first rubbing direction and the second rubbing direction to be a large value (for example, greater than a predetermined value), helps to further reduce the area of the shadow region S12.

Further, the angle α between the first rubbing direction and the second rubbing direction is equal to arctan (b/a). In actual applications, the bigger the angle α between the first rubbing direction and a correct rubbing direction, the higher the required anchoring capability of the liquid crystal molecules 1. In case that the anchoring capability of the liquid crystal molecules 1 is limited, the liquid crystal molecules 2 in the region S22 may probably be not aligned normally. In addition, when the angle α between the first rubbing direction and the correct rubbing direction is too large, the anchoring capability of the liquid crystal molecules 2 may also be reduced, and is difficult to make the liquid crystal molecules 3 tend to be aligned correctly, thereby resulting in light leakage. When the angle α between the first rubbing direction and the second rubbing direction is equal to arctan (b/a), the occurrence of light leakage may be avoided to the greatest extent.

Further, the angle α is 11°.

Further, in the method of the present disclosure, the first rubbing and the second rubbing are performed on the alignment layer with Nylon, fibers or lint.

Further, the alignment layer is made of polyimide.

The present disclosure further provides a liquid crystal display panel including the alignment layer manufactured by the above-mentioned method.

The liquid crystal display panel may be applied to any products or components having a display function, such as an electronic paper, a mobile phone, a flat-panel PC, a TV, a display, a laptop PC, a digital photo frame and a navigator.

Further, the spacer of the liquid crystal display panel has a height greater than or equal to 3.4 μm.

Further, the spacer of the liquid crystal display panel has a height less than 3.9 μm.

The foregoings are merely exemplary embodiments of the present disclosure. It should be appreciated that, a person skilled in the art may make further modifications and improvements without departing from the principle of the present disclosure, and these modifications and improvements also fall within the scope of the present invention.

What is claimed is:

1. A method for rubbing an alignment layer, comprising:
   performing at least three rubbings on the alignment layer of a liquid crystal display;
   wherein the performing at least three rubbings on the alignment layer of the liquid crystal display includes:
      performing an N-th rubbing on the alignment layer of a liquid crystal display in a first rubbing direction; and
      performing an (N+1)-th rubbing on the alignment layer on which the N-th rubbing has been performed in a second rubbing direction;
   wherein N is an integer greater than 1;
   the second rubbing direction is an arrangement direction of liquid crystal molecules when the liquid crystal molecules are arranged correctly on the alignment layer; and
   the second rubbing direction is different from the first rubbing direction.

2. The method according to claim 1, wherein an angle between the first rubbing direction and the second rubbing direction is greater than or equal to arctan (b/a), where a represents a row pitch between spacers of the liquid crystal display panel, and b represents a width of one spacer.

3. The method according to claim 1, wherein the performing an N-th rubbing on the alignment layer of a liquid crystal display in a first rubbing direction comprises:
   performing the N-th rubbing on a first surface of the alignment layer in the first rubbing direction;
   the performing an (N+1)-th rubbing on the alignment layer on which the N-th rubbing has been performed in a second rubbing direction comprises:
   performing the (N+1)-th rubbing on the first surface on which the N-th rubbing has been performed in the second rubbing direction.

4. The method according to claim 1, wherein an angle between the first rubbing direction and the second rubbing direction is 11°.

5. The method according to claim 1, wherein the performing an N-th rubbing on the alignment layer of a liquid crystal display in a first rubbing direction comprises:
   rubbing the alignment layer in the first rubbing direction, except for first regions of the alignment layer which correspond to spacers in the first rubbing direction;
   the performing an (N+1)-th rubbing on the alignment layer on which the N-th rubbing has been performed in a second rubbing direction comprises:
   rubbing the alignment layer in the second rubbing direction, except for second regions of the alignment layer which correspond to the spacers in the second rubbing direction;
   wherein the first regions have at least one intersection with the second regions.

6. The method according to claim 5, wherein each of the first regions has an intersection with corresponding one of the second regions; and an area of the intersection of each of the first regions and the corresponding one of the second regions, is smaller than an area of the corresponding one of the second regions.

7. The method according to claim 6, wherein a rubbing strength of the (N+1)-th rubbing is higher than that of the N-th rubbing.

* * * * *